(12) United States Patent
Yagi

(10) Patent No.: US 11,772,428 B2
(45) Date of Patent: Oct. 3, 2023

(54) TIRE

(71) Applicant: Sumitomo Rubber Industries, Ltd., Kobe (JP)

(72) Inventor: Kenta Yagi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 230 days.

(21) Appl. No.: 17/336,760

(22) Filed: Jun. 2, 2021

(65) Prior Publication Data

US 2021/0387480 A1 Dec. 16, 2021

(30) Foreign Application Priority Data

Jun. 16, 2020 (JP) ................. 2020-103861

(51) Int. Cl.
  *B60C 11/03* (2006.01)
  *B60C 11/12* (2006.01)
(52) U.S. Cl.
  CPC ...... *B60C 11/0306* (2013.01); *B60C 11/0304* (2013.01); *B60C 11/12* (2013.01); *B60C 11/1236* (2013.01); *B60C 2011/0341* (2013.01); *B60C 2011/0353* (2013.01); *B60C 2011/0358* (2013.01); *B60C 2011/0367* (2013.01); *B60C 2011/0369* (2013.01); *B60C 2011/0372* (2013.01)
(58) Field of Classification Search
  CPC . B60C 11/0304; B60C 11/0306; B60C 11/11; B60C 11/12; B60C 11/1236; B60C 2011/036; B60C 2011/0341; B60C 2011/0358; B60C 2011/0369; B60C 2011/0353; B60C 2011/0372
  See application file for complete search history.

(56) References Cited

U.S. PATENT DOCUMENTS

| 2013/0087261 A1 | 4/2013 | Kageyama | |
| 2018/0201071 A1* | 7/2018 | Mishima | ............ B60C 11/0309 |
| 2019/0283506 A1* | 9/2019 | Iwata | .................. B60C 11/1376 |

FOREIGN PATENT DOCUMENTS

| EP | 2233321 A1 * | 9/2010 | ......... B60C 11/0306 |
| JP | H04138902 A * | 5/1992 | ..... B60C 2011/1268 |
| JP | 2013-82308 A | 5/2013 | |

* cited by examiner

*Primary Examiner* — Justin R Fischer
*Assistant Examiner* — Philip N Schwartz
(74) *Attorney, Agent, or Firm* — Birch, Stewart, Kolasch & Birch, LLP

(57) ABSTRACT

A tire has a tread portion comprising a first land region divided by a circumferential groove extending continuously in the tire circumferential direction. The first land region is provided with first lateral grooves extending thereacross to circumferentially divide the first land region into blocks. The blocks include a first block provided with a second lateral groove and sipes. The second lateral groove has two end portions which are inclined with respect to the tire axial direction to a first direction toward one side in the tire axial direction, and a central portion between the two end portions which is inclined with respect to the tire axial direction to a second direction opposite to the first direction toward the above-said one side in the tire axial direction.

16 Claims, 10 Drawing Sheets

TIRE

TECHNICAL FIELD

The present invention relates to a tire, more particularly to a tread pattern.

BACKGROUND ART

Patent Document 1 below discloses a pneumatic tire whose tread portion comprises axially outermost shoulder blocks provided with longitudinal sipes extending in a tire circumferential direction, and buttress portions are provided with buttress grooves each extending in a tire radial direction. The edges of the longitudinal sipes help to improve cornering performance of the tire when running on icy roads.
Patent Document 1: Japanese Patent Application Publication No. 2013-082308

SUMMARY OF THE INVENTION

Problems to be Solved by the Invention

In recent years, there is a strong demand for tires intended for use in winter season which can exert further improved cornering performance on icy road surfaces.

In order to effectively remove a water film existing between the tire tread and ice-covered road, the inventors have studied and have improved shapes of lateral grooves and sipes, and the present invention was completed.

It is therefore, an object of the present invention to provide a tire capable of exhibiting excellent cornering performance on icy road surfaces.

According to the present invention, a tire comprises: a tread portion comprising a first land region divided by a circumferential groove extending continuously in the tire circumferential direction, wherein the first land region is provided with first lateral grooves extending thereacross to circumferentially divide the first land region into blocks, the blocks include a first block provided with a second lateral groove and sipes, and the second lateral groove has two end portions which are inclined with respect to the tire axial direction to a first direction toward one side in the tire axial direction, and a central portion between the two end portions which is inclined with respect to the tire axial direction to a second direction opposite to the first direction toward the above-said one side in the tire axial direction.

It is preferable that the groove width of the second lateral groove is smaller than the groove widths of the first lateral grooves.

It is preferable that the groove width in each of the two end portions is larger than the groove width in the central portion.

It is preferable that the length in the tire axial direction of each of the two end portions is smaller than the length in the tire axial direction of the central portion.

It is preferable that the first lateral grooves are each inclined with respect to the tire axial direction to the second direction toward the above-said one side in the tire axial direction.

It is preferable that the angle of the central portion with respect to the tire axial direction is larger than the angles of the first lateral grooves with respect to the tire axial direction.

It is preferable that a maximum groove depth in the central portion is smaller than a maximum depth of the sipes.

It is preferable that the sipes are inclined with respect to the tire axial direction to the above-said first direction toward the above-said one side in the tire axial direction.

It is preferable that the sipes are not connected to the second lateral groove.

It is preferable that each of the sipes undulates while extending in the length direction and the depth direction thereof.

It is preferable that the angles of the first lateral grooves with respect to the tire axial direction are in a range from 20 to 40 degrees.

It is preferable that the angle of the central portion with respect to the tire axial direction is in a range from 50 to 70 degrees.

It is preferable that the angles of the two end portions with respect to the tire axial direction are in a range from 20 to 40 degrees.

It is preferable that the first land region is disposed between the tire equator and an inboard tread edge which is intended to be positioned toward the inside of a vehicle when the tire is mounted on the vehicle.

It is preferable that the tread portion is provided with a plurality of circumferential grooves extending continuously in the tire circumferential direction and including the above-said circumferential groove and an inboard crown circumferential groove which is positioned adjacently to the first land region on the tire equator side of the first land region, and the inboard crown circumferential groove has a largest groove width among the plurality of circumferential grooves.

DESCRIPTION OF THE PREFERRED EMBODIMENT

Embodiments of the present invention will now be described in detail in conjunction with accompanying drawings.

Figure 1:
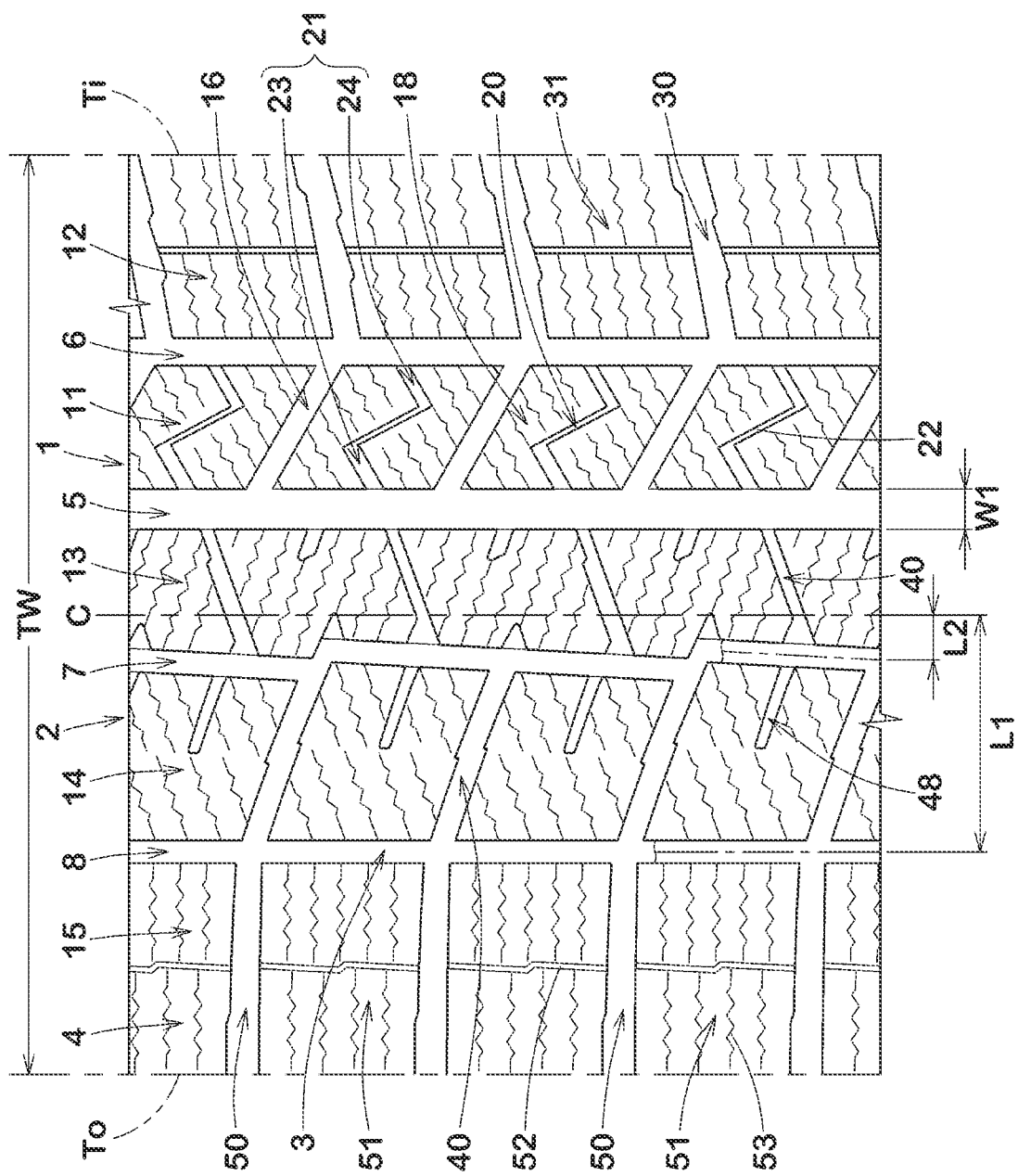
FIG. 1 is a developed partial view of a tread portion of a tire as an embodiment of the present invention.

FIG. 1 shows an embodiment of the present invention which is a pneumatic tire 1 for a passenger car designed for use in winter season.
The present invention is however, not limited to such winter or snow tire.

As well known in the art, a pneumatic tire comprises a tread portion 2 whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

In this embodiment, the pneumatic tire 1 is specified about which sidewall portion is to be positioned on the outboard side when the tire is mounted on a vehicle. Therefore, the tread portion 2 of the tire 1 has an outboard tread edge To to be positioned away from the center of the vehicle body, and an inboard tread edge Ti be positioned towards the center of the vehicle body.
For example, the tire sidewall portion to be located on the outboard side when mounted on the vehicle is provided with an indication which means "outside", and the sidewall portion to be located on the inboard side may be provided with an indication which means "inside".

The tread edges To and Ti are the axial outermost edges of the ground contacting patch of the tire which occurs under a normally loaded condition when the camber angle of the tire is zero.

The under-mentioned tread width Tw is the width measured under an unloaded condition, as the axial distance between the tread edges determined as above.

In this application including specification and claims, various dimensions, positions and the like of the tire refer to those under the unloaded condition of the tire unless otherwise noted.

In the case of a pneumatic tire, the above-mentioned unloaded condition is such that the tire is mounted on a standard wheel rim and inflate to a standard pressure but loaded with no tire load.

The above-mentioned normally loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.
The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load capacity" in ETRTO, the maximum value given in the above-mentioned table in TRA or the like.

In the case of an airless tire and a tire for which standards have not yet been established, the unloaded condition is that the tire is prepared for normal use according to the intended usage of the tire but no tire load is applied. The normally loaded condition is that the tire is prepared for normal use according to the intended usage of the tire, and a normal tire load or design load is applied.

The tread portion 2 is provided, between the tread edges Ti and To, with four circumferential grooves 3 continuously extending in the tire circumferential direction. Thereby, the tread portion 2 is axially divided into five land regions 4.

The present invention is however, not limited to such tread pattern. For example, the tread portion 2 may be provided with three circumferential grooves 3 so that the tread portion is axially divided into four land regions 4.

In this embodiment, the four circumferential grooves 3 include an inboard crown circumferential groove 5, an inboard shoulder circumferential groove 6, an outboard crown circumferential groove 7, and an outboard shoulder circumferential groove 8.

The inboard crown circumferential groove 5 is disposed between the tire equator c and the inboard tread edge Ti. The inboard shoulder circumferential groove 6 is disposed between the inboard crown circumferential groove 5 and the inboard tread edge Ti.
The outboard crown circumferential groove 7 is disposed between the tire equator c and the outboard tread edge To.

The outboard shoulder circumferential groove 8 is disposed between the outboard crown circumferential groove 7 and the outboard tread edge To.

In the present embodiment, the inboard crown circumferential groove 5, the inboard shoulder circumferential groove 6, and the outboard shoulder circumferential groove 8 are straight grooves extending in parallel with the tire circumferential direction.
The outboard crown circumferential groove 7 is a zigzag groove made up of linear groove segments.

The present invention is however, not limited to such groove combination. For example, each of the circumferential grooves 3 may be configured as a straight groove, a zigzag groove, a wavy groove or a hybrid thereof.

The distance L1 in the tire axial direction from the tire equator c to the widthwise center line of the outboard shoulder circumferential groove 8 is preferably set in a range from 20% to 35% of the tread width Tw.

The distance L1 in the tire axial direction from the tire equator c to the widthwise center line of the inboard shoulder circumferential groove 6 is preferably set in a range from 20% to 35% of the tread width TW.

The distance L2 in the tire axial direction from the tire equator c to the widthwise center line of the outboard crown circumferential groove 7 is preferably set in a range from 3% to 15% of the tread width Tw.

The distance L2 in the tire axial direction from the tire equator c to the widthwise center line of the inboard crown circumferential groove 5 is preferably set in a range from 3% to 15% of the tread width TW.

Preferably, the distance L2 in the tire axial direction from the tire equator c to the widthwise center line of the inboard crown circumferential groove 5 is larger than the distance L2 in the tire axial direction from the tire equator c to the widthwise center line of the outboard crown circumferential groove 7.

The groove widths w1 of the circumferential grooves 3 are at least 3 mm. The groove widths w1 of the circumferential grooves 3 are preferably set in a range from 2.0% to 5.0% of the tread width Tw. In the present embodiment, the groove width w1 of the inboard crown circumferential groove 5 is the largest among the four circumferential grooves 3.

The land regions 4 include a first land region 11. It is preferable that the first land region 11 is positioned between the tire equator c and the inboard tread edge Ti. In the present embodiment, the first land region 11 is positioned or defined between the inboard crown circumferential groove 5 and the inboard shoulder circumferential groove 6.

Figure 2:
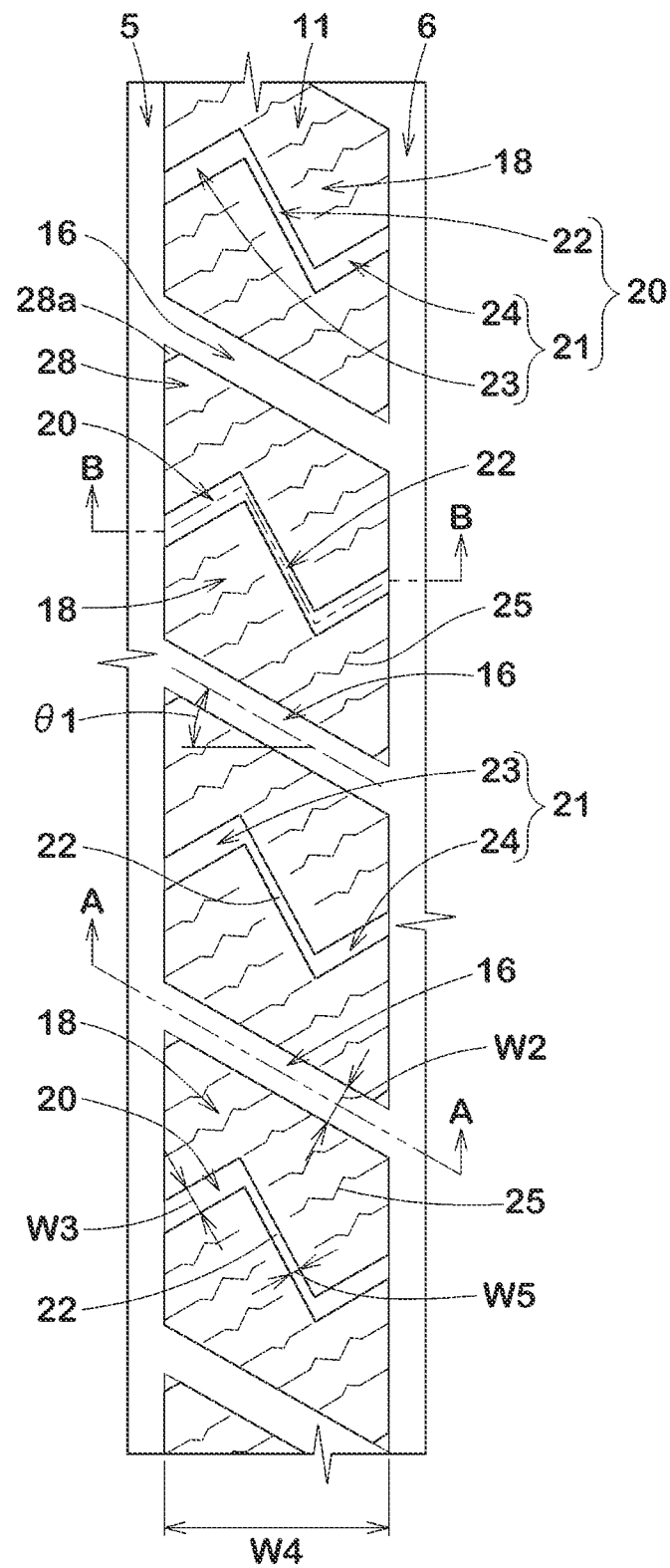
FIG. 2 is a partial top view of the first land region of FIG. 1

FIG. 2 is a top view of a part of the first land region 11. As shown, the first land region 11 is provided with a plurality of first lateral grooves 16 extending across the entire width of the first land region 11. Therefore, the first land region 11 is circumferentially divided into first blocks 18 separated by the first lateral grooves 16.

The first blocks 18 include a subdivided first block 18 which is circumferentially subdivided by a second lateral groove 20 and provided with a plurality of sipes 25.
The second lateral groove 20 extends from the inboard crown circumferential groove 5 to the inboard shoulder circumferential groove 6.

In this application, the term "sipe" means a very narrow groove whose width between two opposite sipe walls is not more than 0.6 mm, inclusive of a cut having no substantial width.

Preferably, the width of the sipe is set in a range from 0.1 to 0.5 mm, more preferably 0.2 to 0.4 mm.

In the present embodiment, each of the sipes is configured so as to have a width within the above range over the entire depth and entire length.

Figure 3:
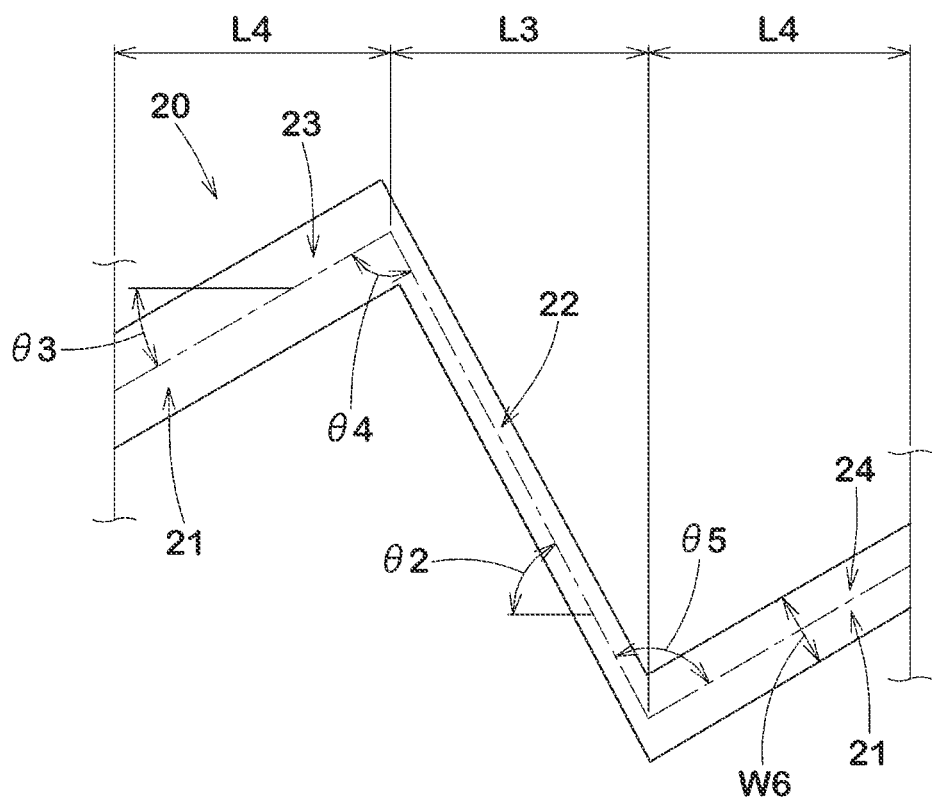
FIG. 3 is an enlarged top view of the second lateral groove of FIG. 2.

However, in the present invention, when a groove has a portion in the groove depth direction whose width is not more than 0.6 mm and which extends in the groove depth direction over at least 50% of the entire groove depth, such groove is considered and treated as "sipe" even if the groove has a portion in the depth direction whose width is more than 0.6 mm. Therefore, when a groove has a portion in the groove depth direction whose width is more than 0.6 mm and which extends in the groove depth direction over more than 50% of the entire groove depth, such a groove is considered and treated as "groove" even if the groove has a portion in the depth direction whose width is not more than 0.6 mm, FIG. 3 is an enlarged top view of the second lateral groove 20.
As shown, the second lateral groove 20 is made up of
two end portions 21 inclined with respect to the tire axial direction to a first direction toward one side in the tire axial direction, and
a central portion 22 extending between the end portions 21 while inclining with respect to the tire axial direction to a second direction opposite to the first direction toward the above-said one side in the tire axial direction.

In the drawings, the expression "incline with respect to the tire axial direction to a first direction toward one side in the tire axial direction" corresponds to "inclined upward to the right", and
the expression "incline with respect to the tire axial direction to a second direction" corresponds to "inclined downward to the right".

Such configuration of the second lateral groove 20 helps to improve cornering performance of the tire when running on icy road surfaces for the following reasons.

The first lateral grooves 16 divide a water film existing on the icy road surface in the tire circumferential direction. The water film divided in the tire circumferential direction by the first lateral grooves 16, is further divided in the tire axial direction by the edges of the second lateral groove 20 since the edges of the second lateral groove 20 have portions convex toward one side in the tire circumferential direction, and portion convex toward the other side in the tire circumferential direction due to the end portions 21 and the central portion 22.

Thus, the water film divided by the first lateral grooves 16 and the second lateral grooves 20 is effectively absorbed by the sipes 25. Due to such action, the edges of the grooves 16 and 20 and the edges of the sipes 25 can exert a large frictional force even on icy road surfaces. Further, the edges of the central portion 22 and the end portions 21 of the second lateral groove 20 provide a frictional force in the tire axial direction, so the cornering performance on icy road surfaces can be effectively improved.

As shown in FIG. 2, all of the first lateral grooves 16 are inclined in the same direction with respect to the tire axial direction. In the present embodiment, all of the first lateral grooves 16 are inclined with respect to the tire axial direction to the second direction toward the above-said one side in the tire axial direction.
The angle θ1 of the first lateral grooves 16 with respect to the tire axial direction is, for example, set in a range from 20 to 40 degrees.
Such first lateral grooves 16 can also provide a frictional force in the tire axial direction on icy road surfaces.

In the present embodiment, the first lateral groove 16 extends linearly having a constant groove width w2.
The groove width w2 of the first lateral groove 16 is, for example, set in a range from 1.0 to 8.0 mm, preferably 2.0 to 6.0 mm.

Figure 4:
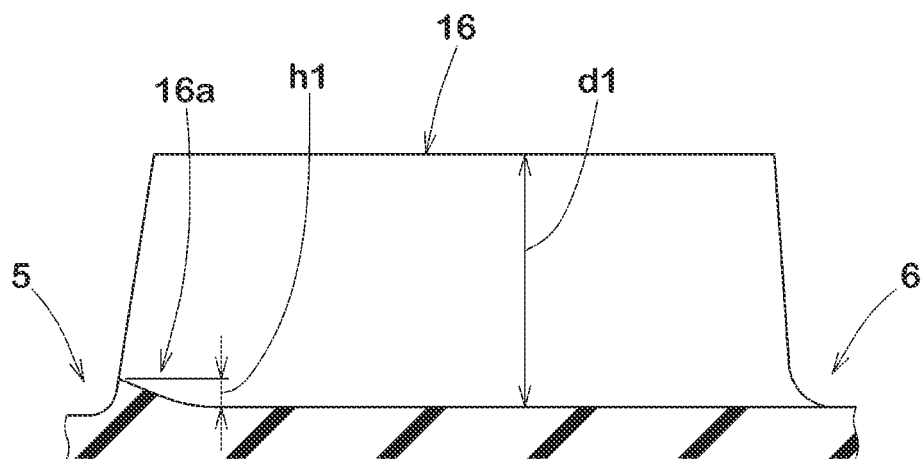
FIG. 4 is a cross-sectional view taken along line A-A of FIG. 2.

FIG. 4 is a cross-sectional view taken along line A-A of FIG. 2, namely, along the first lateral groove 16.
The maximum groove depth d1 of the first lateral groove 16 is, for example, set in a range from 3.0 to 11.0 mm, preferably 6.0 to 9.5 mm.

The bottom of the first lateral groove 16 partially protrudes radially outwardly to have a protruding portion 16a. The protruding portion 16a is located at an end in the tire axial direction of the first lateral groove 16.

In the present embodiment, as shown in FIG. 4, the protruding portion 16a is located at the end on the inboard crown circumferential groove 5 side of the first lateral groove 16. The protruding height hi in the tire radial direction of the protruding portion 16a from the deepest position is, for example, set in a range from 0.5 to 2.0 mm. The length in the tire axial direction of the protruding portion 16a is preferably set in a range of not more than 30%, more preferably in a range from 5% to 15%, of the length in the tire axial direction of the first lateral groove 16. Such protruding portion 16a can prevent the first lateral groove 16 from being clogged by snow and ice fragments.

As shown in FIG. 2, the acute-angled protruding corner portion 28 formed between each of the first lateral grooves 16 and the inboard crown circumferential groove 5 is provided with a chamfer 28a inclined and extended from the ground contacting top surface of the first block 18 in order to prevent uneven wear and chipping-off of the first block.

The groove width of the second lateral groove 20 is set to be smaller than the groove widths w2 of the first lateral grooves 16. In the prevent embodiment, the second lateral groove 20 is configured such that a maximum groove width w3 of the second lateral groove 20 is given to only one of the two end portions 21, and the maximum groove width w3 is smaller than the groove width w2 of the first lateral grooves 16.
For example, the maximum groove width w3 of the second lateral groove 20 is set in a range from 40% to 60% of the groove width w2 of the first lateral grooves 16.

Such second lateral groove 20 helps to improve the cornering performance on icy road surfaces and the steering stability on dry road surfaces (hereinafter, may be simply referred to as "steering stability") in a well-balanced manner.

The central portion 22 of the second lateral groove 20 extends across a center in the tire axial direction or center line of the first land region 11. In the present embodiment, the central portion 22 crosses the centroid of the first block 18. The length L3 in the tire axial direction of the central portion 22 is set in a range from 25% to 45% of the width W4 in the tire axial direction of the first land region 11.

In this application, the length of a groove or groove portion is measured along the widthwise center line of the groove.

In the present embodiment, the central portion 22 extends linearly, while keeping a constant inclination angle θ2 with respect to the tire axial direction.

Preferably, the angle θ2 of the central portion 22 is larger than the angle θ1 of the first lateral groove 16 with respect to the tire axial direction. Specifically, the angle θ2 of the central portion 22 is in a range from 50 to 70 degrees, preferably 55 to 65 degrees.

In this application, the angle of a groove or groove portion is that of the widthwise center line of the groove.

As shown in FIG. 2, the groove width W5 in the central portion 22 is the minimum groove width of the second lateral groove 20. The groove width w5 in the central portion 22 is larger than 0.6 mm and not more than 3.0 mm.

In the present embodiment, the central portion 22 is configured as a narrow groove portion whose groove width is larger than 0.6 mm and not larger than 2.0 mm.

As a result, the opposite groove walls in the central portion 22 can contact with each other to increase the apparent rigidity of the first block 18. Therefore, the first block 18 is suppressed from being collapsed, which helps to improve the steering stability.

The groove depth in the central portion 22 is preferably smaller than the groove depth of the first lateral groove 16. More preferably, the maximum groove depth in the central portion 22 is smaller than the maximum depth of the sipes 25.

It is preferable that the groove depth in the central portion 22 is set in a range from 20% to 40% of the depth of the sipes 25. For example, the groove depth in the central portion 22 is set in a range from 0.2 to 5.0 mm, preferably 0.5 to 3.0 mm.

As a result, the cornering performance on icy road surfaces and steering stability are improved in a well-balanced manner.

In the present embodiment, the two end portions 21 of the second lateral groove 20 are a first end portion 23 connected to the inboard crown circumferential groove 5 and a second end portion 24 connected to the inboard shoulder circumferential groove 6.

The first end portion 23 and the second end portion 24 each extends linearly, while inclining at a constant angle with respect to the tire axial direction.

As a result, the second lateral groove 20 in the present embodiment is formed in an N-shaped groove which has the central portion 22, the first end portion 23 extending from the central portion 22 to the inboard crown circumferential groove 5, and the second end portion 24 extending from the central portion 22 to the inboard shoulder circumferential groove 6.

As shown in FIG. 3, the angles θ3 of the two end portions 21 with respect to the tire axial direction are set in a range from 10 to 50 degrees, preferably 20 to 40 degrees. The angle θ4 between the central portion 22 and the first end portion 23 is set in a range from 70 to 110 degrees, preferably 80 to 100 degrees.

The angle θ5 between the central portion 22 and the second end portion 24 is set in a range from 70 to 110 degrees, preferably 80 to 100 degrees.

As a result, the edges of the second lateral groove 20 becomes easier to break a water film on the icy road surface, and the cornering performance on icy road surfaces is improved.

The groove widths w6 in the two end portions 21 are larger than 0.6 mm and not more than 5.0 mm.

In the present embodiment, the groove widths w6 in the two end portions 21 are set in a range from 1.0 to 4.0 mm, preferably 2.0 to 3.0 mm. It is preferable that the groove width w6 in each of the two end portions 21 is larger than the groove width W5 in the central portion 22. Specifically, the groove widths w6 are set in a range from 2.0 to 3.5 times the groove width w5. Further, the groove width in the second end portion 24 is set to be smaller than the groove width in the first end portion 23. Such two end portions 21 effectively enhance the cornering performance on icy road surfaces.

In order to improve the cornering performance on icy road surfaces and the steering stability in a well-balanced manner, the length L4 in the tire axial direction of each of the two end portions 21 is set to be larger than the length L3 in the tire axial direction of the central portion 22.

The length L4 in the tire axial direction of each of the two end portions 21 is, for example, set in a range from 25% to 40% of the width w4 in the tire axial direction of the first land region 11.

Figure 5:
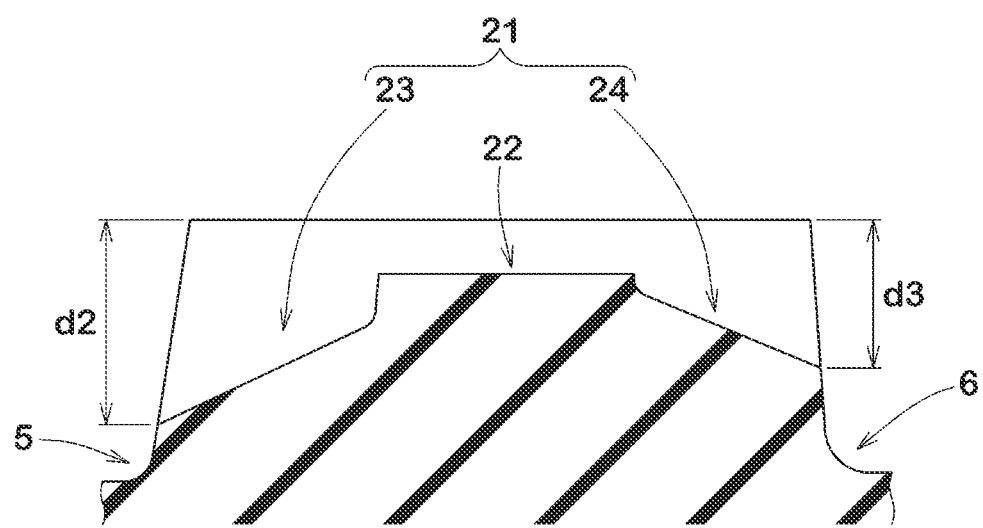
FIG. 5 is a cross-sectional view taken along line B-B of FIG. 2.

FIG. 5 shows a cross-sectional view taken along line B-B of FIG. 2. As shown, the groove depths in the two end portions 21 are preferably larger than the groove depth in the central portion 22, and smaller than the groove depth of the first lateral groove 16.

The maximum groove depths d2 and d3 in the two end portions 21 are, for example, set in a range from 2.0 to 7.0 mm, preferably 3.0 to 7.0 mm.

The groove depth in the first end portion 23 and the groove depth in the second end portion 24 are increased from the central portion 22 toward the respective ends of the second lateral groove 20.

Preferably, the maximum groove depth d2 in the first end portion 23 is greater than the maximum groove depth d3 in the second end portion 24. Thereby, the rigidity of the first block 18 is increased toward the inboard tread edge Ti side so as to improve the steering stability on dry road surfaces.

As shown in FIG. 2, each of the first blocks 18 is provided with a plurality of sipes 25 inclined with respect to the tire axial direction.

At least one of the plurality of sipes 25 is inclined to the above-said first direction toward the above-said one side in the tire axial direction. Preferably and in the present embodiment, each of the plurality of sipes 25 is inclined to the above-said first direction toward the above-said one side in the tire axial direction.

The angle of each sipe 25 with respect to the tire axial direction is, for example, set in a range from 10 to 50 degrees, preferably 20 to 40 degrees.

Such sipes 25 cooperate with the first lateral grooves 16 and the second lateral grooves 20 to provide friction in multiple directions and improve the cornering performance on icy road surfaces.

In this embodiment, each of the sipes 25 extends in a zigzag manner.

In this case, namely, in a zigzag sipe, the inclination direction and angle of the sipe are determined by the inclination direction and angle of a straight line drawn between both ends of the sipe.

It is preferable that, in the first block 18, at least one of the sipes 25 is not connected to the second lateral groove 20. In the present embodiment, each of the sipes 25 provided in the first block 18 is not connected to the second lateral groove 20. The distances from the second lateral groove 20 to the adjacent ends of the sipes 25 are, for example, set in a range from 0.5 to 2.0 mm, preferably 0.8 to 1.2 mm.
Thereby, the length of each sipe 25 is sufficiently secured, and at the same time, the rigidity of the first block 18 is maintained.

Figure 6:
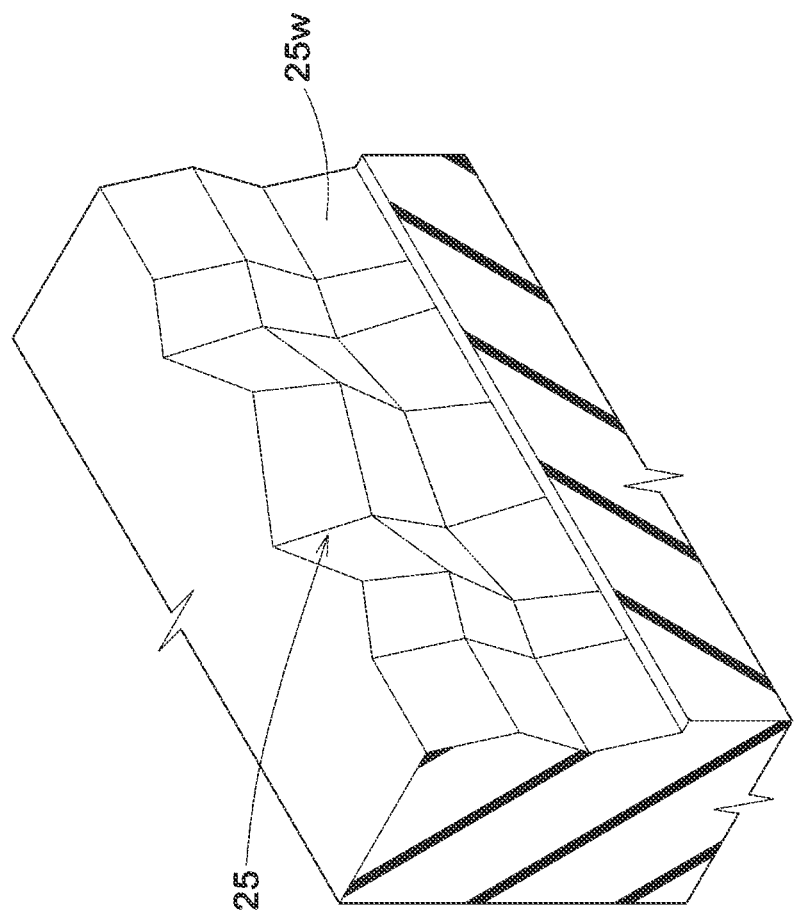
FIG. 6 is a perspective view of a sipe wall of the sipe of FIG. 2.

FIG. 6 is a perspective view showing one of the opposite walls 25w of the sipe 25.
In the present embodiment, each of the sipes 25 is a so called "three-dimensional sipe" which undulates while extending in the length direction and depth direction thereof as shown in FIG. 6. Thereby, when the two opposite sipe walls 25w come into contact with each other, they are engaged with each other, and the apparent rigidity of the first block 18 is effectively increased to improve the steering stability.
The present invention is however, not limited to such three-dimensional sipe. The sipe 25 may extend linearly in the length direction and depth direction thereof.

In order to improve the cornering performance on icy road surfaces and the steering stability on a dry road surface in a well-balanced manner, the depth of the sipe 25 is, for example, set in a range from 2.0 to 9.0 mm, preferably 4.0 to 8.0 mm.

In the present embodiment, as shown in FIG. 1, the tread portion 2 has a second land region 12, a third land region 13, a fourth land region 14, and a fifth land region 15 in addition to the above-said first land region 11.

The second land region 12 is defined between the inboard shoulder circumferential groove 6 and the inboard tread edge Ti, and located adjacently to the first land region 11 on the inboard tread edge Ti side thereof.

The third land region 13 is defined between the outboard crown circumferential groove 7 and the inboard crown circumferential groove 5, and located adjacently to the first land region 11 on the outboard tread edge To side thereof.

The fourth land region 14 is defined between the outboard crown circumferential groove 7 and the outboard shoulder circumferential groove 8, and located adjacently to the third land region 13 on the outboard tread edge To side thereof.

The fifth land region 15 is defined between the outboard shoulder circumferential groove 8 and the outboard tread edge To, and located adjacently to the fourth land region 14 on the outboard tread edge To side thereof.

Figure 7:
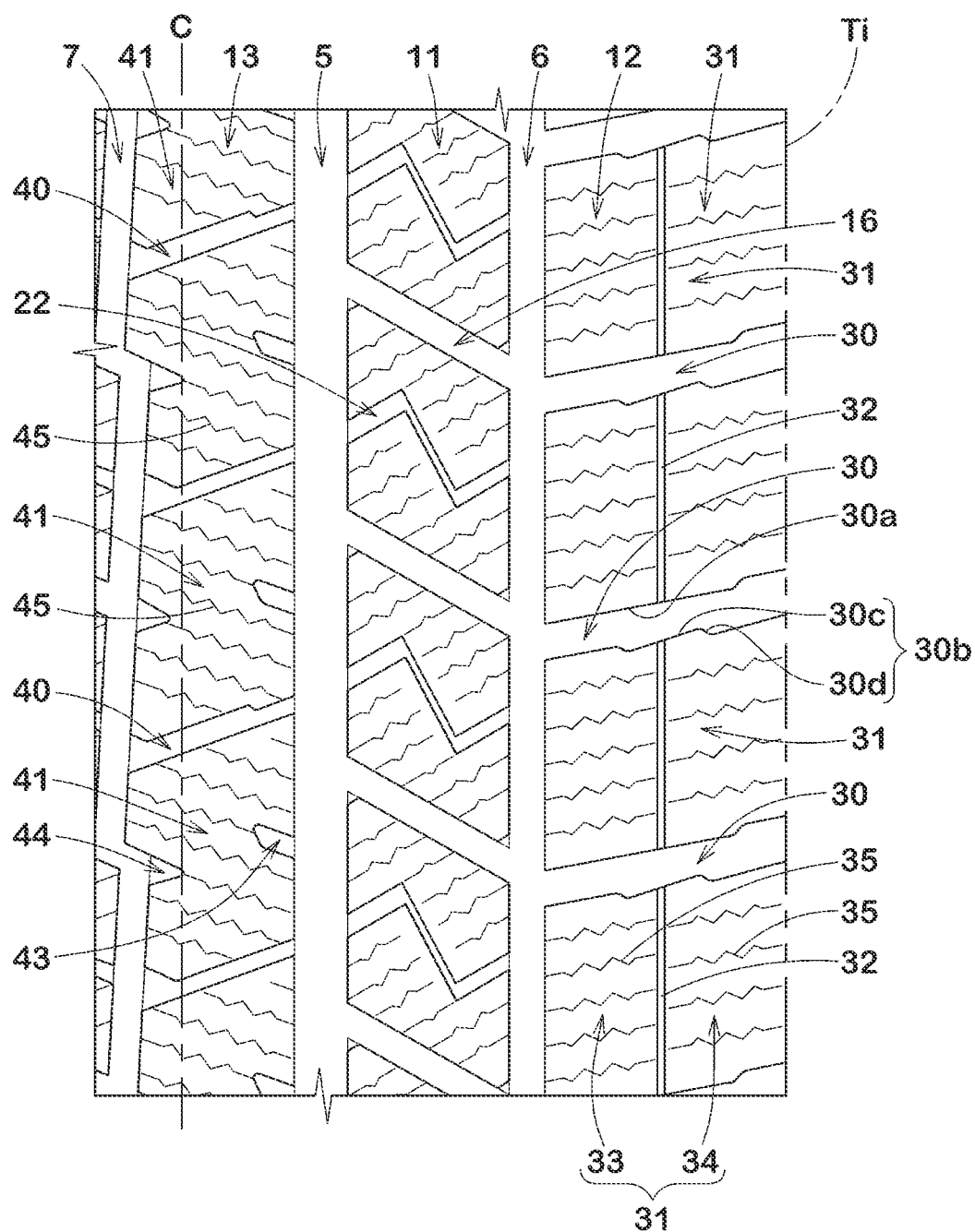
FIG. 7 is a developed partial view of the tread portion showing the first land region, the second land region, and the third land region of FIG. 1.

FIG. 7 shows the first land region 11, the second land region 12, and the third land region 13.

The second land region 12 is provided with a plurality of inboard shoulder lateral grooves 30 extending across the entire width of the second land region 12 to circumferentially divide the second land region 12 into inboard shoulder blocks 31.

The inboard shoulder lateral grooves 30 are inclined with respect to the tire axial direction to the above-said first direction toward the above-said one side in the tire axial direction. The angles of the inboard shoulder lateral grooves 30 with respect to the tire axial direction are, for example, set in a range from 5 to 15 degrees. Preferably, the angles of the inboard shoulder lateral grooves 30 with respect to the tire axial direction are smaller than the angle of the first lateral grooves 16 with respect to the tire axial direction.

Such inboard shoulder lateral grooves 30 enhance the traction performance on icy road surfaces.

The inboard shoulder lateral groove 30 has a first groove edge 30a and a second groove edge 30b. The first groove edge 30a extends linearly, for example. The second groove edge 30b is bent in a zigzag manner, for example. Specifically, the second groove edge 30b comprises gently inclined edges 30c and steeply inclined edges 30d alternating in the length direction thereof. The gently inclined edge 30c extends in the tire axial direction. The angle of the steeply inclined edge 30d with respect to the tire axial direction is larger than the angle of the gently inclined edge 30c with respect to the tire axial direction. Further, the length of the steeply inclined edge 30d is smaller than the length of the gently inclined edge 30c. The inboard shoulder lateral groove 30 having such second groove edges 30b can compact snow and ice fragments existing in the groove.

In the present embodiment, in the relationship between each of the inboard shoulder lateral grooves 30 and the adjacent one of the first lateral grooves 16,
an extension of an end portion of the inboard shoulder lateral groove 30 on the inboard shoulder circumferential groove 6 side which extension is extended in parallel with the tire axial direction overlaps with
at least part of an end portion of the first lateral groove 16 on the inboard shoulder circumferential groove 6 side.
As a result, the inboard shoulder lateral grooves 30 and the first lateral grooves 16 work together to enhance the traction performance on icy road surfaces.

The inboard shoulder block 31 is provided with an inboard shoulder longitudinal groove 32 extending in the tire circumferential direction.

The inboard shoulder longitudinal groove 32 extends between two of the inboard shoulder lateral grooves 30 adjacent to each other in the tire circumferential direction. Such inboard shoulder longitudinal groove 32 can generate friction in the tire axial direction on icy road surfaces.

By the inboard shoulder longitudinal groove 32, the inboard shoulder block 31 is axially subdivided into a first piece 33 between the inboard shoulder longitudinal groove 32 and the inboard shoulder circumferential groove 6, and a second piece 34 between the inboard shoulder longitudinal groove 32 and the inboard tread edge Ti.

Each of the first piece 33 and the second piece 34 is provided with a plurality of inboard shoulder sipes 35 each extending in a zigzag manner.
In the present embodiment, each inboard shoulder sipe 35 is inclined with respect to the tire axial direction to the above-said first direction toward the above-said one side in the tire axial direction. Preferably, the angle of each inboard shoulder sipe 35 with respect to the tire axial direction is smaller than the angle of the sipes 25 provided in the first blocks 18 with respect to the tire axial direction.
Thereby, the cornering performance on icy road surfaces and the traction performance on icy road surfaces are improved in a well-balanced manner.

The spacings between the inboard shoulder sipes 35 provided in the first piece 33 are preferably set to be larger than the spacings between the sipes 25 provided in the first block 18.
The spacings between the inboard shoulder sipes 35 provided in the second piece 34 are preferably set to be larger than the spacings between the inboard shoulder sipes 35 provided in the first piece 33.

By setting the sipe spacings as above, the rigidity of the second land region 12 becomes larger than the rigidity of the first land region 11, and the steering stability on a dry road surface is improved.

Here, the "spacing" between two sipes means the smallest distance between the two sipes.

The third land region 13 is provided with a plurality of crown lateral grooves 40 extending across the entire width of the third land region 13 to circumferentially divide the third land region 13 into a plurality of crown blocks 41.

The crown lateral grooves 40 are inclined with respect to the tire axial direction to the above-said first direction toward the above-said one side in the tire axial direction. The angles of the crown lateral grooves 40 with respect to the tire axial direction are, for example, set in a range from 15 to 25 degrees. Preferably, the angles of the crown lateral grooves 40 with respect to the tire axial direction are smaller than the angles of the first lateral grooves 16 with respect to the tire axial direction.

Preferably, the angles of the crown lateral grooves 40 with respect to the tire axial direction are larger than the angles of the inboard shoulder lateral grooves 30 with respect to the tire axial direction.

By setting the angles as above, the crown lateral grooves 40, the first lateral grooves 16, and the inboard shoulder lateral grooves 30 work together to provide friction in multiple directions, and the cornering performance and traction performance on icy road surfaces are improved.

It is preferable that an end portion of each crown lateral groove 40 on the inboard crown circumferential groove 5 side does not overlap with
an extension of an end portion of any one of the first lateral grooves 16 on the inboard crown circumferential groove 5 side which extension is extended in parallel with the tire axial direction.

In the relationship between each of the crown lateral grooves 40 and the adjacent one of the first end portions 23 of the second lateral grooves 20, it is preferable that the end portion of the crown lateral groove 40 on the inboard crown circumferential groove 5 side overlaps with
an extension of the first end portion 23 of the second lateral groove 20 which extension is extended along the length direction of the first end portion 23.

As a result, the crown lateral grooves 40 and the first lateral grooves 16 cooperate to improve the traction performance on icy road surfaces.

It is preferable that an end portion of each crown lateral groove 40 on the outboard crown circumferential groove 7 side is increased in the groove width toward the outboard tread edge To. Such crown lateral groove 40 is less likely to be clogged with snow and ice fragments.

In the present embodiment, the crown blocks 41 are each provided with a first interrupted groove 43, a second interrupted groove 44, and a plurality of crown sipes 45 each extending in a zigzag manner.

The first interrupted groove 43 extends from the inboard crown circumferential groove 5 and is terminated within the crown block 41.

The second interrupted groove 44 extends from the outboard crown circumferential groove 7 and is terminated within the crown block 41.

In the present embodiment, the first interrupted groove 43 and the second interrupted groove 44 are terminated without reaching the center position in the tire axial direction of the crown block 41.

Further, the first interrupted groove 43 and the second interrupted groove 44 are inclined with respect to the tire axial direction to the above-said second direction toward the above-said one side in the tire axial direction.

Such first interrupted groove 43 and second interrupted groove 44 are useful for improving the cornering performance on icy road surfaces and the steering stability in a well-balanced manner.

In the present embodiment, the crown sipes 45 are each inclined with respect to the tire axial direction to the above-said second direction toward the above-said one side in the tire axial direction.

The angles of the crown sipes 45 with respect to the tire axial direction are smaller than the angles of the sipes 25 provided in the first blocks 18 with respect to the tire axial direction. Such crown sipes 45 improve the cornering performance and traction performance on icy road surfaces in a well-balanced manner.

Figure 8:
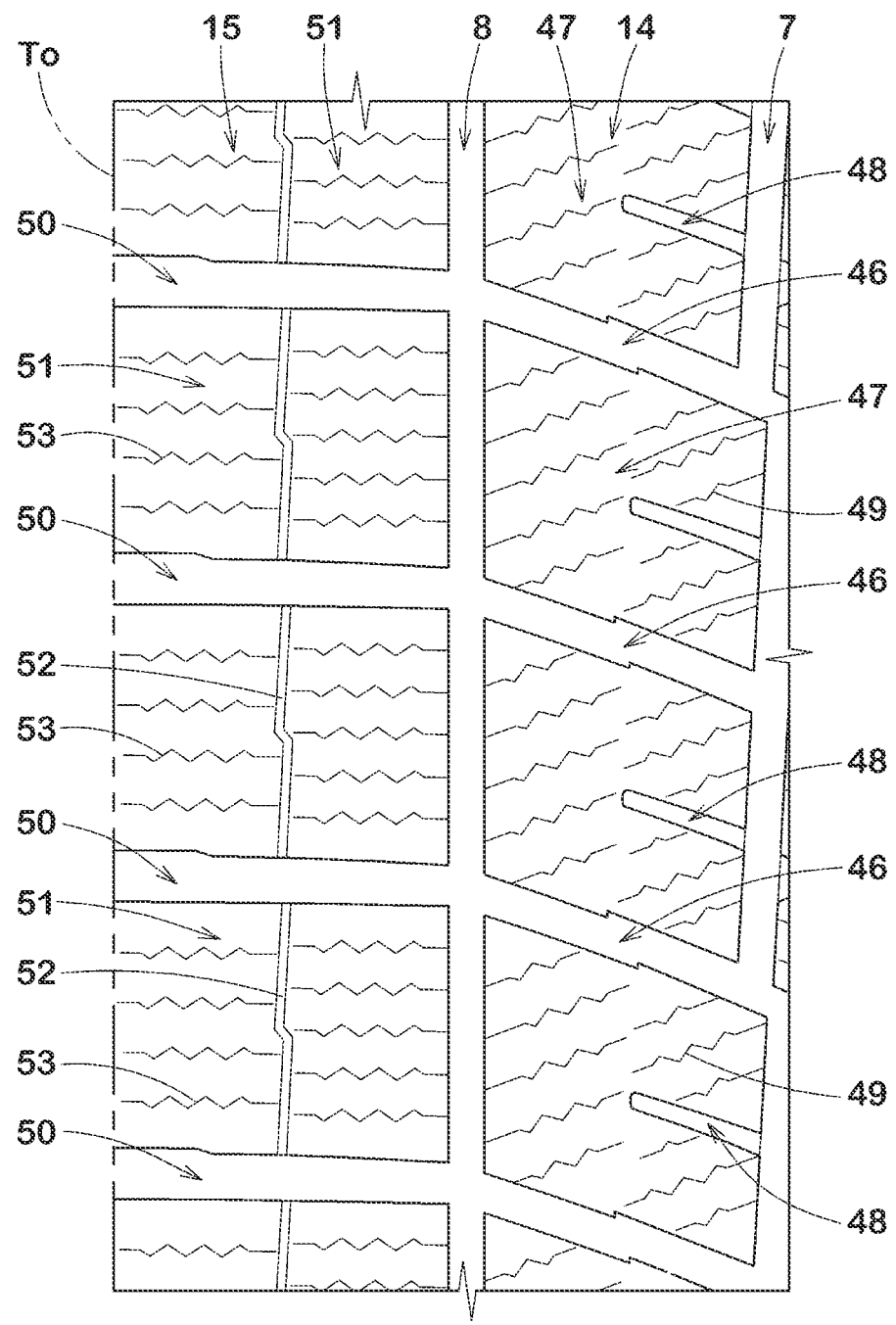
FIG. 8 is a developed partial view of the tread portion showing the fourth land region and the fifth land region of FIG. 1.

FIG. 8 shows the fourth land region 14 and the fifth land region 15. As shown, the fourth land region 14 is provided with a plurality of outboard middle lateral grooves 46 extending across the entire width of the fourth land region 14.

As a result, the fourth land region 14 is circumferentially divided into a plurality of outboard middle blocks 47 by the outboard middle lateral grooves 46.

In the present embodiment, the outboard middle lateral grooves 46 are inclined with respect to the tire axial direction to the above-said second direction toward the above-said one side in the tire axial direction.

Preferably, the angles of the outboard middle lateral grooves 46 with respect to the tire axial direction are set in a range from 15 to 25 degrees.

Preferably, the angles of the outboard middle lateral grooves 46 with respect to the tire axial direction are smaller than the angles of the first lateral grooves 16 with respect to the tire axial direction.

The outboard middle blocks 47 are each provided with an interrupted outboard middle groove 48 and a plurality of outboard middle sipes 49 each extending in a zigzag manner.

The interrupted outboard middle groove 48 extends from the outboard crown circumferential groove 7 and is terminated within the outboard middle block 47.

In the present embodiment, the interrupted outboard middle groove 48 is inclined with respect to the tire axial direction to the above-said second direction toward the above-said one side in the tire axial direction.

The angle of the interrupted outboard middle groove 48 with respect to the tire axial direction is, for example, set in a range from 10 to 20 degrees.

Such interrupted outboard middle grooves 48 help to improve the traction performance on icy road surfaces while maintaining the rigidity of the outboard middle blocks 47.

It is preferable that, as shown in FIG. 1, in the relationship between each of the interrupted outboard middle grooves 48 and the adjacent one of the crown lateral grooves 40,
an end portion of the interrupted outboard middle groove 48 on the outboard crown circumferential groove 7 side overlaps with an extension of an end portion of the crown lateral groove 40 on the outboard crown circumferential groove 7 side which extension is extended in parallel with the tire axial direction.

As a result, the interrupted outboard middle grooves 48 and the crown lateral grooves 40 work together to improve the traction performance on icy road surfaces.

As shown in FIG. 8, the outboard middle sipes 49 are inclined with respect to the tire axial direction to the above-said first direction toward the above-said one side in the tire axial direction.

Preferably, the angles of the outboard middle sipes 49 with respect to the tire axial direction are smaller than the angles of the sipes 25 provided in the first block 18 with respect to the tire axial direction.

Such outboard middle sipes 49 provide friction in multiple directions and help to improve the cornering performance on icy road surfaces.

The fifth land region 15 is provided with a plurality of outboard shoulder lateral grooves 50 extending across the entire width of the fifth land region 15.
Thus, the fifth land region 15 is circumferentially divided into a plurality of outboard shoulder blocks 51 by the outboard shoulder lateral grooves 50.

In the present embodiment, the outboard shoulder lateral grooves 50 extend at an angle of not more than 10 degrees with respect to the tire axial direction.
It is preferable that, in the relationship between each of the outboard shoulder lateral grooves 50 and the adjacent one of the outboard middle lateral grooves 46,
an end portion of the outboard shoulder lateral groove 50 on the outboard shoulder circumferential groove 8 side overlaps with an extension of an end portion of the outboard middle lateral groove 46 on the outboard shoulder circumferential groove 8 side which extension is extended in parallel with the tire axial direction.

The outboard shoulder blocks 51 are each provided with an outboard shoulder longitudinal groove 52 extending in the tire circumferential direction, and
a plurality of outboard shoulder sipes 53 each extending in a zigzag manner.

The outboard shoulder longitudinal groove 52 extends between two of the outboard shoulder lateral grooves 50 adjacent to each other in the tire circumferential direction. It is preferable that the outboard shoulder longitudinal groove 52 is partially bent. Such outboard shoulder longitudinal grooves 52 provide friction in the tire circumferential direction on icy road surfaces.

Preferably, the angles of the outer shoulder sipes 53 with respect to the tire axial direction are smaller than the angles of the sipes 25 provided in the first blocks 18 with respect to the tire axial direction.

In the present embodiment, the tread portion 2 has a land ratio in a range from 70% to 90%, preferably 80% to 88%. As a result, the cornering performance on icy road surfaces and the steering stability on a dry road surface can be improved in a well-balanced manner.
Here, the "land ratio" means a ratio of the ground contacting area of the tread portion 2 to the overall area of the tread portion 2.

Figure 9:
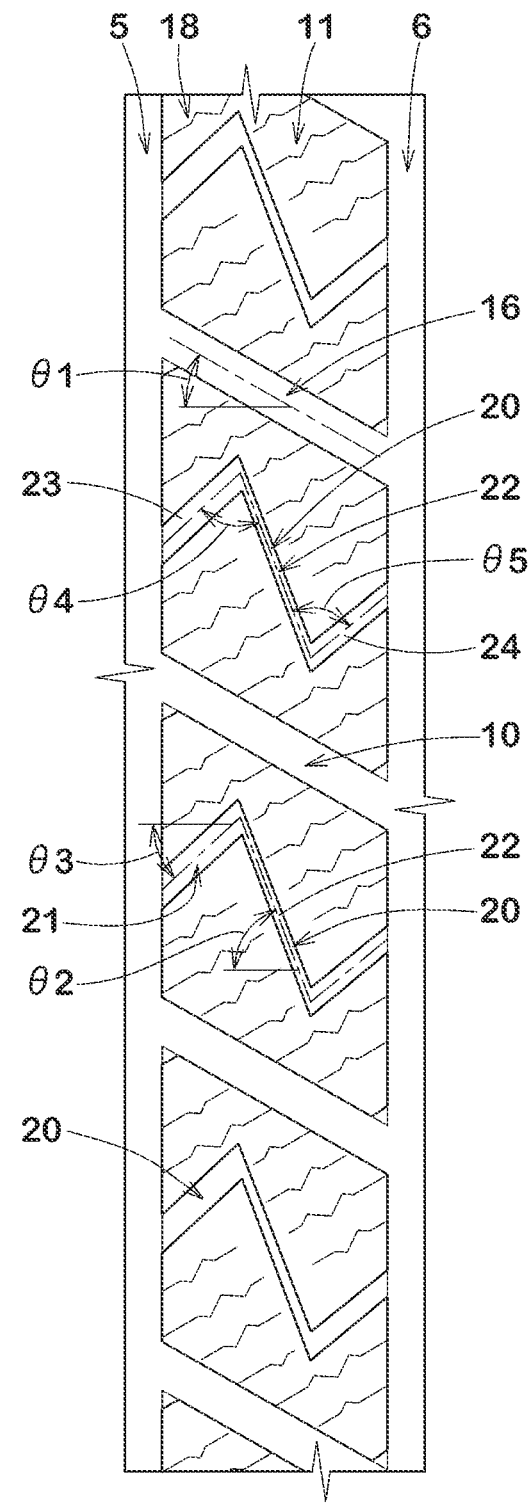
FIG. 9 is a partial top view of another example of the first land region.

FIG. 9 shows a modified example of the second lateral groove 20 in which the angle θ2 of the central portion 22 with respect to the tire axial direction, and the angles θ3 of the two end portions 21 with respect to the tire axial direction are set to be greater than the angle θ1 of the first lateral grooves 16 with respect to the tire axial direction. As a result, the cornering performance on icy road surfaces is further improved.

Further, the angle θ4 between the central portion 22 and the first end portion 23 and the angle θ5 between the central portion 22 and the second end portion 24 are acute angles. This makes it easier for the edges of the second lateral groove 20 to break the water film. Preferably, the angles θ4 and θ5 are set in a range from 60 to 80 degrees.

Figure 10:
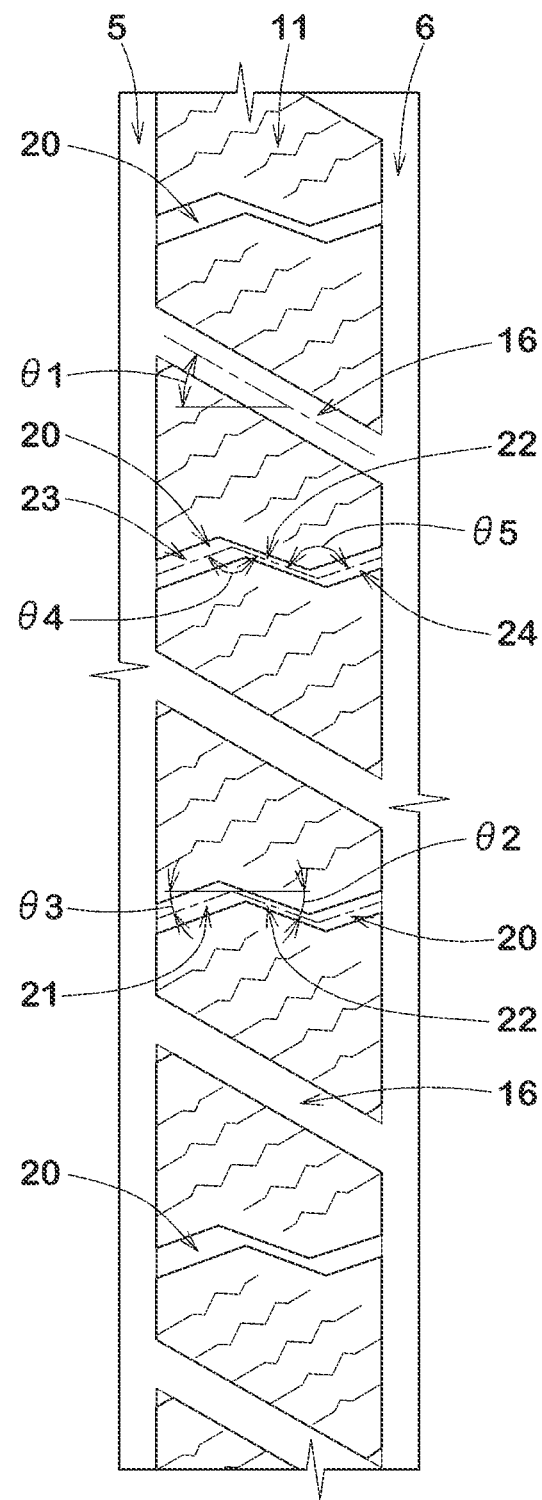
FIG. 10 is a partial top view of still another example of the first land region.

FIG. 10 shows another modified example of the second lateral groove 20 in which the angle θ2 of the central portion 22 with respect to the tire axial direction, and the angles θ3 of the two end portions 21 with respect to the tire axial direction are set to be smaller than the angle θ1 of the first lateral grooves 16 with respect to the tire axial direction.

Further, the angle θ4 between the central portion 22 and the first end portion 23 and the angle θ5 between the central portion 22 and the second end portion 24 are obtuse angles. As a result, the rigidity of the first block 18 is improved, and excellent steering stability is exhibited. Preferably, the angles θ4 and θ5 are set in a range from 130 to 150 degrees.

While detailed description has been made of a preferable embodiment of the present invention, the present invention can be embodied in various forms without being limited to the illustrated embodiment.

Comparison Tests

Based on the tread pattern shown in FIG. 1, pneumatic tires of size 195/65R15 were experimentally manufactured as test tires (working example tires Ex.1-Ex.3 and comparative example tire Ref), by changing specifications of the second lateral grooves 20 as shown in Table 1.

Figure 11:
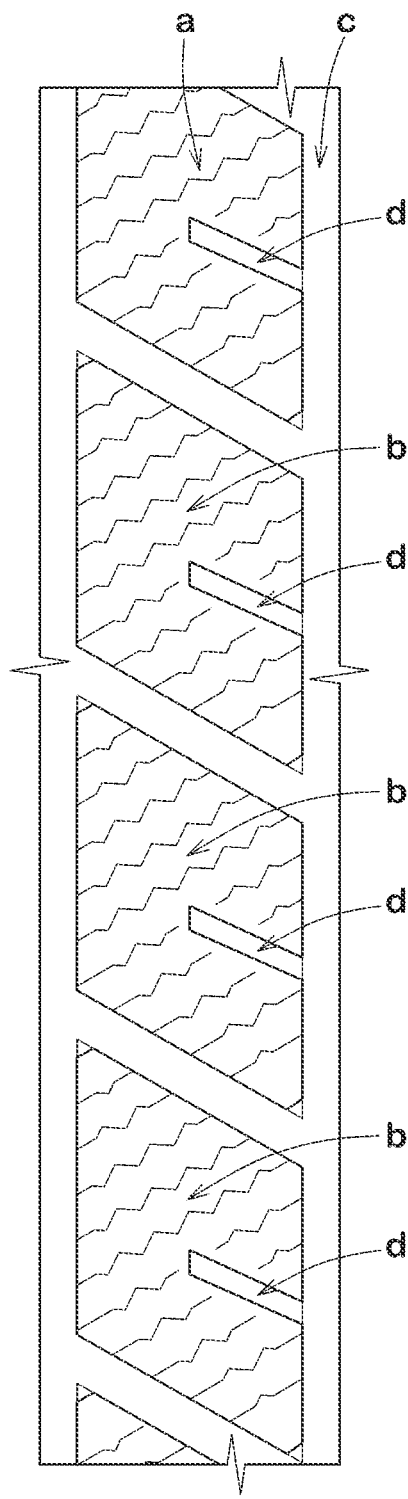
FIG. 11 is a partial top view of a first land region of a comparative example tire.

In the comparative example tire, as shown in FIG. 11, the first land region (a) was divided into the first blocks (b) and each first block was provided with sipes 25 as in the working example tires. But, each first block was provided with an interrupted groove (d) extending linearly from the inboard shoulder circumferential groove (c) and terminated within the block (b). Each test tire was tested for cornering performance on icy road surfaces and steering stability on dry road surfaces.

<Cornering Performance on Icy Road Surfaces>

Using a test car (1500 cc front wheel drive passenger car) with test tires mounted on 15×6.0 JJ wheel rims and inflated to 230 kPa, a test driver evaluated the cornering performance when running on an icy road surface.
The results are indicated in Table 1 by an index based on the comparative example tire Ref being 100, wherein the larger the value, the better the cornering performance.

<Steering Stability on Dry Road Surfaces>
Using the above-mentioned test car, the test driver evaluated the steering stability when running on a dry road surface.
The results are indicated in Table 1 by an index based on the comparative example tire Ref being 100, wherein the larger the value, the better the steering stability.

TABLE 1

| Tire | Ref | Ex. 1 | Ex. 2 | Ex. 3 |
| --- | --- | --- | --- | --- |
| first and region | FIG. 11 | FIG. 2 | FIG. 9 | FIG.10 |
| second lateral grooves | — | | | |
| central portion's angle θ2 (deg.) | — | 60 | 68 | 20 |
| end portion's angle θ3 (deg.) | — | 30 | 45 | 20 |
| Cornering performance | 100 | 108 | 109 | 105 |
| Steering stability | 100 | 101 | 100 | 102 |

As shown in Table 1, it was confirmed that each of the working example tires having the second lateral grooves according to the present invention exhibited excellent cornering performance on icy road surfaces. Also it was confirmed that each of the working example tires maintained the steering stability on dry road surfaces.

Further, based on the tread pattern shown in FIG. 1 including the first land region shown in FIG. 2, pneumatic tires of size 195/65R15 were experimentally manufactured as test tires (working example tires Ex.1 and Ex.4-Ex.10), by changing only the length and depth of the central portion as shown in Table 2. Thus, the width of the first land region and the depth of the sipe were common to all examples.

Then, the above-mentioned tests were carried out as described above. The test results are shown in Table 2.

TABLE 2

| Tire | Ex. 1 | Ex. 4 | Ex. 5 | Ex. 6 | Ex. 7 | Ex. 8 | Ex. 9 | Ex. 10 |
|---|---|---|---|---|---|---|---|---|
| first land region | FIG. 2 | FIG. 2 | FIG. 2 | FIG. 2 | FIG. 2 | FIG. 2 | FIG. 2 | FIG. 2 |
| central portion length L3/first land region width W4 (%) | 34 | 25 | 30 | 40 | 45 | 34 | 34 | 34 |
| central portion depth/sipe depth (%) | 33 | 33 | 33 | 33 | 33 | 10 | 20 | 40 |
| Cornering performance | 108 | 106 | 107 | 108 | 108 | 104 | 106 | 108 |
| Steering stability | 101 | 102 | 101 | 101 | 100 | 103 | 103 | 100 |

As shown in Table 2, it was confirmed that the length and depth of the central portion are highly related to the cornering performance on icy road surfaces and the steering stability on a dry road surface.

REFERENCE SIGNS LIST 2 tread portion
3 circumferential groove
11 first land region
16 first lateral groove
18 first block
20 second lateral groove
21 end portion
22 central portion
25 sipe

The invention claimed is:

1. A tire comprising: a tread portion comprising a first land region divided by a circumferential groove extending continuously in the tire circumferential direction, wherein
the first land region is provided with first lateral grooves extending thereacross to circumferentially divide the first land region into blocks,
the blocks include a first block provided with a second lateral groove and sipes,
the second lateral groove has
two end portions which are inclined with respect to the tire axial direction to a first direction toward one side in the tire axial direction, and
a central portion between the two end portions which is inclined with respect to the tire axial direction to a second direction opposite to the first direction toward said one side in the tire axial direction,
the tread portion has an inboard tread edge which is intended to be positioned toward the inside of a vehicle when the tire is mounted on the vehicle, and an outboard tread edge which is intended to be positioned toward the outside of the vehicle when the tire is mounted on the vehicle,
the first land region is disposed between the inboard tread edge and a tire equator,
the tread portion further comprises
a row of crown blocks circumferentially separated by crown lateral grooves, and
a row of inboard shoulder blocks circumferentially separated by inboard shoulder lateral grooves, and disposed between the inboard tread edge and the tire equator, and
the first land region is disposed between the row of the crown blocks and the row of the inboard shoulder blocks,
the angles of the crown lateral grooves with respect to the tire axial direction are in a range from 15 to 25 degrees, and smaller than the angles of the first lateral grooves with respect to the tire axial direction, but larger than the angles of the inboard shoulder lateral grooves with respect to the tire axial direction.

2. The tire according to claim 1, wherein the groove width of the second lateral groove is smaller than the groove widths of the first lateral grooves.

3. The tire according to claim 1, wherein the groove width in each of the two end portions is larger than the groove width in the central portion.

4. The tire according to claim 3, wherein the length in the tire axial direction of each of the two end portions is smaller than the length in the tire axial direction of the central portion.

5. The tire according to claim 4, wherein the bottom of each of the first lateral grooves partially protrudes radially outwardly to have a protruding portion, and the protruding portion is located at an end in the tire axial direction of the first lateral groove.

6. The tire according to claim 1, wherein the length in the tire axial direction of each of the two end portions is smaller than the length in the tire axial direction of the central portion.

7. The tire according to claim 1, wherein the first lateral grooves are each inclined with respect to the tire axial direction to the second direction toward said one side in the tire axial direction.

8. The tire according to claim 1, wherein the angle of the central portion with respect to the tire axial direction is larger than the angles of the first lateral grooves with respect to the tire axial direction.

9. The tire according to claim 1, wherein a maximum groove depth in the central portion is smaller than a maximum depth of the sipes.

10. The tire according to claim 1, wherein the sipes are inclined with respect to the tire axial direction to said first direction toward said one side in the tire axial direction.

11. The tire according to claim 3, wherein the sipes are inclined with respect to the tire axial direction to said first direction toward said one side in the tire axial direction.

12. The tire according to claim 1, wherein the sipes are not connected to the second lateral groove.

13. The tire according to claim 1, wherein
the tread portion is provided with a plurality of circumferential grooves extending continuously in the tire circumferential direction and including said circumferential groove and an inboard crown circumferential groove which is positioned adjacently to the first land region on the tire equator side of the first land region, and
the inboard crown circumferential groove has a largest groove width among the plurality of circumferential grooves.

14. The tire according to claim 1, wherein
the angles of the inboard shoulder lateral grooves with respect to the tire axial direction are in a range from 5 to 15 degrees, and smaller than the angles of the first lateral grooves with respect to the tire axial direction.

15. A tire comprising: a tread portion comprising a first land region divided by a circumferential groove extending continuously in the tire circumferential direction, wherein
the first land region is provided with first lateral grooves extending thereacross to circumferentially divide the first land region into blocks,
the blocks include a first block provided with a second lateral groove and sipes,
the second lateral groove has
two end portions which are inclined with respect to the tire axial direction to a first direction toward one side in the tire axial direction, and
a central portion between the two end portions which is inclined with respect to the tire axial direction to a second direction opposite to the first direction toward said one side in the tire axial direction,
the tread portion has an inboard tread edge which is intended to be positioned toward the inside of a vehicle when the tire is mounted on the vehicle, and an outboard tread edge which is intended to be positioned toward the outside of the vehicle when the tire is mounted on the vehicle,
the first land region is disposed between the inboard tread edge and a tire equator and
the tread portion further comprises a row of outboard middle blocks circumferentially separated by outboard middle lateral grooves, and disposed between the outboard tread edge and the tire equator, wherein
the angles of the outboard middle lateral grooves with respect to the tire axial direction are in a range from 15 to 25 degrees, and smaller than the angles of the first lateral grooves with respect to the tire axial direction.

16. The tire according to claim 15, wherein the tread portion further comprises
a row of crown blocks circumferentially separated by crown lateral grooves, and
a row of inboard shoulder blocks circumferentially separated by inboard shoulder lateral grooves, and disposed between the inboard tread edge and the tire equator, wherein
the first land region is disposed between the row of the crown blocks and the row of the inboard shoulder blocks and wherein
the angles of the crown lateral grooves with respect to the tire axial direction are in a range from 15 to 25 degrees, and smaller than the angles of the first lateral grooves with respect to the tire axial direction, but larger than the angles of the inboard shoulder lateral grooves with respect to the tire axial direction.

* * * * *